United States Patent [19]

Sakurada et al.

[11] 4,397,534
[45] Aug. 9, 1983

[54] DEVICE FOR DISPLAYING BULB PHOTOGRAPHING OPERATION TIME IN A PHOTOGRAPHIC CAMERA

[75] Inventors: Nobuaki Sakurada, Yokohama; Nobuaki Date, Kawasaki; Masami Shimizu, Tokyo; Hiroshi Aizawa, Kawasaki, all of Japan

[73] Assignee: Canon Kabushiki Kaisha, Tokyo, Japan

[21] Appl. No.: 379,910

[22] Filed: May 19, 1982

Related U.S. Application Data

[63] Continuation of Ser. No. 261,803, May 8, 1981, abandoned.

[30] Foreign Application Priority Data

May 14, 1980 [JP] Japan .................................. 55-63792

[51] Int. Cl.³ ............................................. G03B 7/08
[52] U.S. Cl. .............................. 354/23 D; 354/60 L; 354/289
[58] Field of Search .............. 354/23 D, 60 R, 60 E, 354/60 L, 60 A, 234, 258, 289

[56] References Cited

U.S. PATENT DOCUMENTS

| 4,134,660 | 1/1979 | Sakurada ......................... 354/289 |
| 4,244,643 | 1/1981 | Tokutomi ......................... 354/289 |
| 4,286,849 | 9/1981 | Uchidoi et al. .................. 354/289 |

Primary Examiner—Russell E. Adams
Attorney, Agent, or Firm—Toren, McGeady and Stanger

[57] ABSTRACT

A display device for displaying the time of a bulb photographing operation is arranged so that a counter for counting the clock pulses starts to operate when the bulb photographing mode is set in the camera and the release operation of the camera is started. A decoder incorporated in the camera decodes the content of the counter and a display instrument displays the output of the decoder in such a manner that the photographer can visually recognize the bulb photographing operation time. Several embodiments of the circuitry for controlling the nature of the display, including timing charts therefor, are set forth.

4 Claims, 6 Drawing Figures

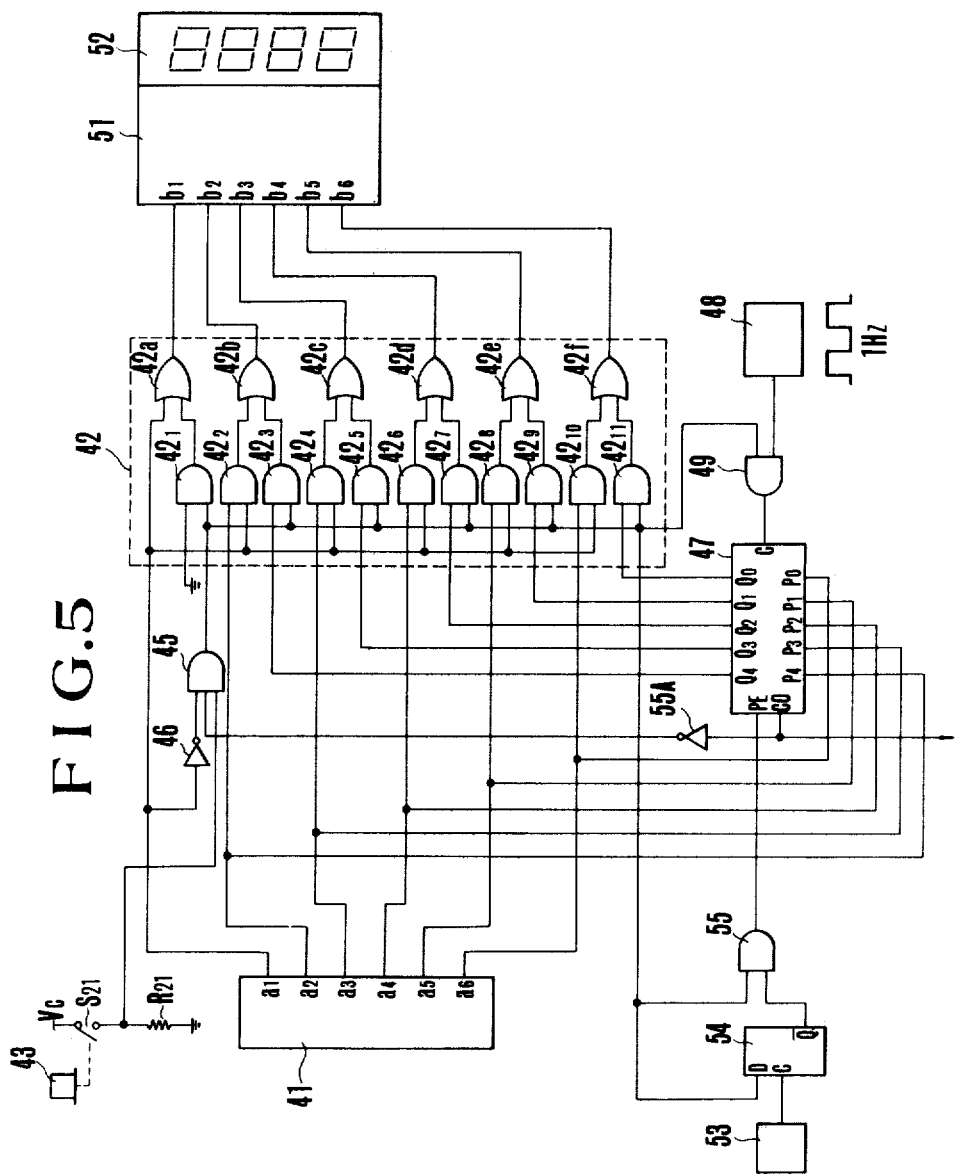
F I G. 5

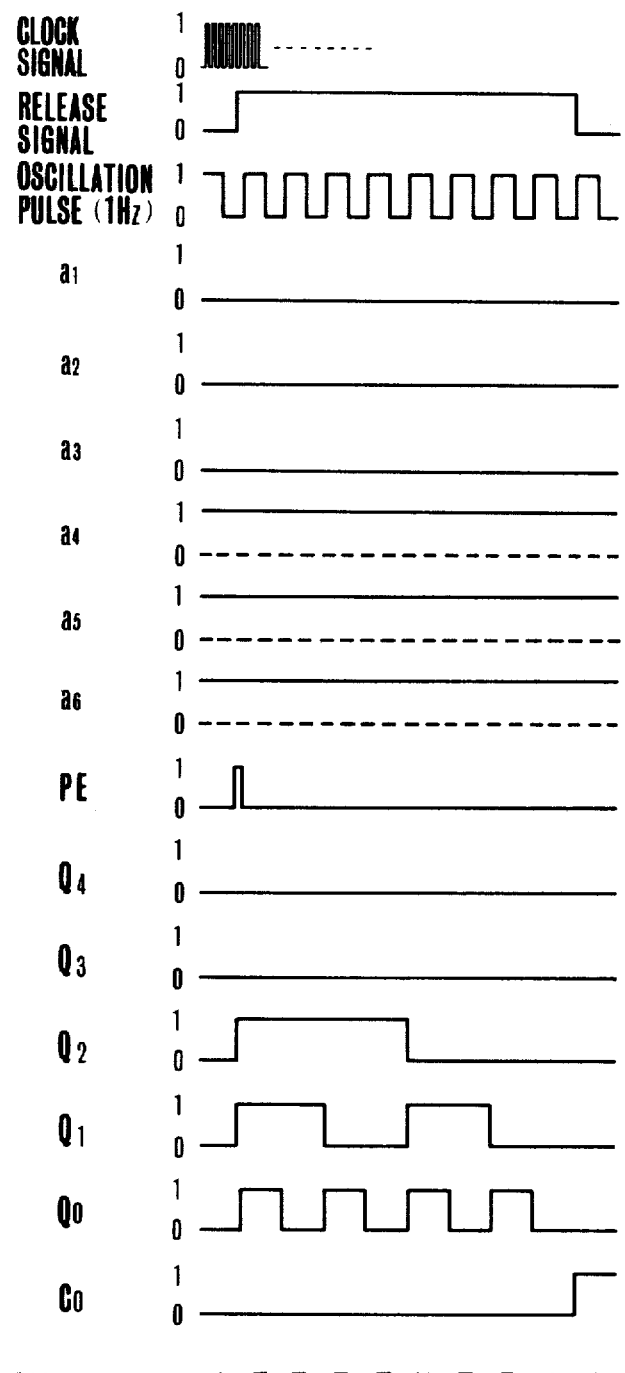

DEVICE FOR DISPLAYING BULB PHOTOGRAPHING OPERATION TIME IN A PHOTOGRAPHIC CAMERA

This is a continuation of application Ser. No. 261,803, filed May 8, 1981 now abandoned.

BACKGROUND OF THE INVENTION

1. Field of the Invention

The present invention relates to a display device for a camera, particularly for displaying a time of the bulb photographing operation.

2. Description of the Prior Art

Until now, the self-timer photographing operation has been displayed by means of a flicker element provided on the camera body. Further, the fact that the remaining time of the self-timer photographing operation is short, is indicated by changing the flickering cycle of the light emitting element. However, the time when the self-timer terminates its operation and the release operation starts cannot be made known in a concrete way.

Further, the bulb photographing operation, or a long exposure time photographing operation is indicated by lighting of a light emitting element. Consequently, in case of long time photographing, the time remaining until the shutter is closed cannot be made known in a concrete way. Particularly in case of bulb photographing, the shutter is opened while the shutter button is being operated, so that the photographer closes the shutter by discontinuing the operation of the shutter release button by counting numbers, watching a stop watch or surmising that the time has elapsed.

As explained above, until now the time or the remaining time of the operation of the self-timer photographing, the bulb photographing or the long time photographing, has not been displayed in a concrete way.

SUMMARY OF THE INVENTION

An object of the present invention is to provide a display device for displaying the operation time of bulb photographing.

Another object of the present invention is to offer a display device for displaying the remaining time of self-timer photographing.

Further, another object of the present invention is to offer a display device for displaying the remaining time of a long exposure time photographing operation.

Further, other objects of the present invention will be obvious from the explanations to be made below in detail.

BRIEF DESCRIPTION OF THE DRAWINGS

FIG. 5 shows the third embodiment of the control circuit of the display device for camera.

FIG. 6 shows the time charts of the respective parts of the circuit shown in FIG. 2.

DESCRIPTION OF THE PREFERRED EMBODIMENTS

Figure 1:
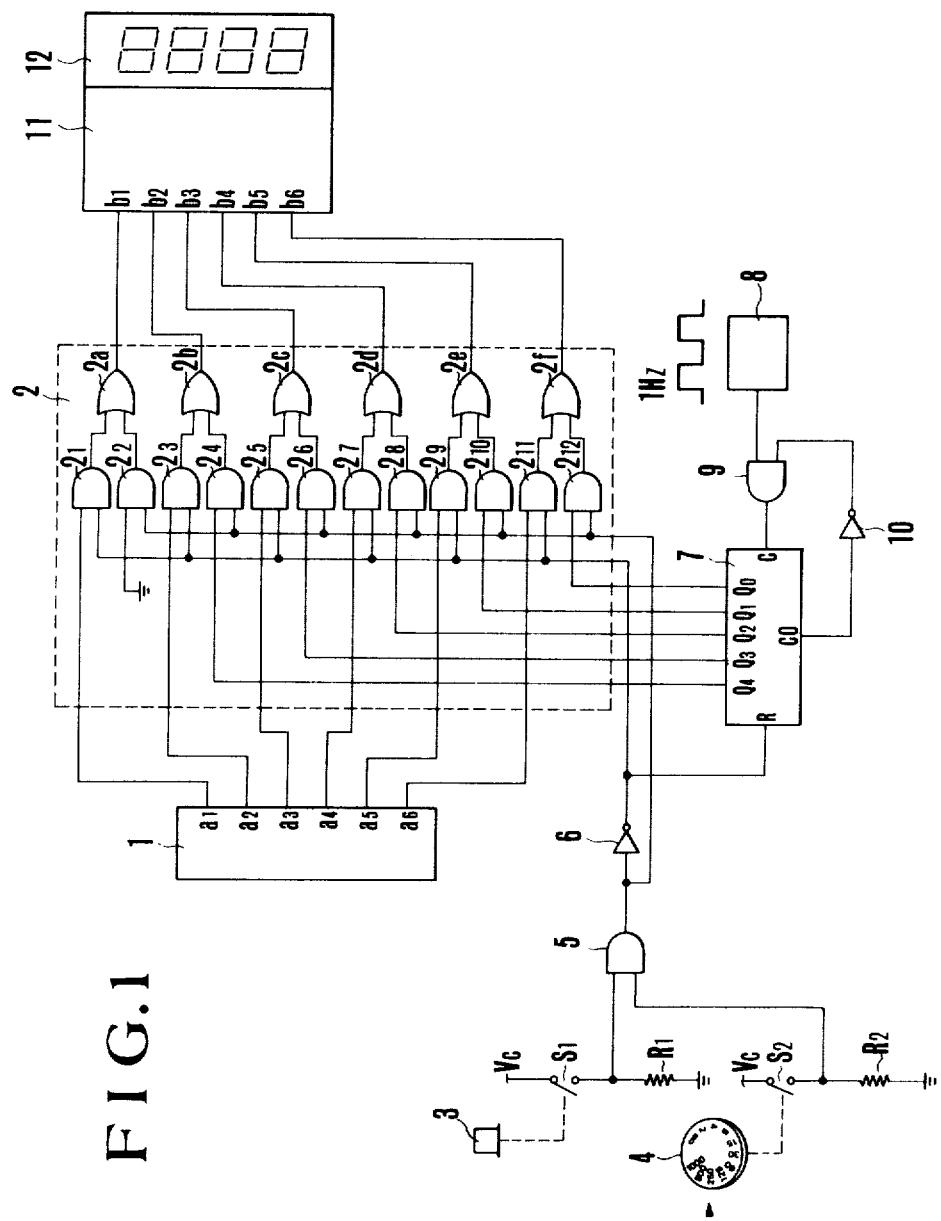
FIG. 1 shows the first embodiment of the control circuit of the display device for camera.

FIG. 1 shows the control circuit for displaying the time lapse of a bulb photographing operation, including a register 1 to which the set shutter time information is given, so as to deliver the shutter time information output to the gate circuit 2. The gate circuit 2 consists of the AND gates $2_1, 2_2 \ldots 2_{12}$ and the OR gates $2a, 2b \ldots 2f$. A switch S1 is closed with the operation of the release button 3, whereby a voltage Vc is applied to one terminal of the switch S1, whose other terminal is grounded through a resistor R1. A switch S2 is closed when the shutter dial 4 is set at the bulb position "B", whereby the voltage Vc is applied to one terminal of the switch S2, whose other terminal is grounded through a resistor R2. An AND gate, 5 has one input terminal connected to the connecting point of the switch S1 to the resistor R1, and the other input terminal is connected to the connecting point of the switch S2 to the resistor R2. The output of the AND gate 5 is applied to one input terminal of the AND gates $2_2, 2_4, 2_6, 2_8, 2_{10}, 2_{12}$ of the above-mentioned gate circuit 2. Further, the inverted output of the AND gate 5 is applied to the reset terminal R of a 5 bit binary counter 7 and also to one input terminal of the AND gates $2_1, 2_3, 2_5, 2_7, 2_9$ and $2_{11}$. To the input terminal C of the above-mentioned binary counter 7, a pulse of 1 Hz is delivered from a pulse generator 8 through an AND gate 9. The carry-out terminal Co of the counter 7 is connected to the remaining input terminal of the AND gate 9 through the inverter 10. The output terminals Q0, Q1, Q2, Q3 and Q4 of the counter 7 are respectively connected to the other input terminal $2_{12}, 2_{10}, 2_8, 2_6$ and $2_4$ of the gate circuit 2. The other input terminal of the AND gate $2_2$ is grounded. The output terminals a1, a2, a3, a4, a5 and a6 of the above-mentioned register 1 are respectively connected to the other input terminal of the AND gates $2_1, 2_3, 2_5, 2_7, 2_9$ and $2_{11}$ of the gate circuit 2. The outputs of the AND gates $2_1$ and $2_2$, that of $2_3$ and $2_4$, that of $2_5$ and $2_6$, that of $2_7$ and $2_8$, that of $2_9$ and $2_{10}$ and that of $2_{11}$ and $2_{12}$ of the gate circuit 2 are respectively given to the OR gates $2a, 2b, 2c, 2d, 2e$ and $2f$. The outputs of the OR gates $2a, 2b, 2c, 2d, 2e$ and $2f$ are given to the display circuit 12 through the decoder driver 11 as the output of the gate circuit 2. The display circuit 12 consists of 4 sets of 7 segment elements connected in parallel so as to display the shutter time or the bulb time in the view finder or the camera body. To the input terminals b1, b2, b3, b4, b5 and b6 of the decoder driver 11 the outputs of the OR gates $2a, 2b, 2c, 2d, 2e$ and $2f$ are respectively given, so as to carry out the display as is given in the table 1 by means of the display circuit 12 in accordance with the signal given to the input terminals b1, b2, b3, b4, b5 and b6.

TABLE 1

| b1 | b2 | b3 | b4 | b5 | b6 | Bulb Time |
|----|----|----|----|----|----|-----------|
| 0 | 0 | 0 | 0 | 0 | 0 | 0 |
| 0 | 0 | 0 | 0 | 0 | 1 | 1 |
| 0 | 0 | 0 | 0 | 1 | 0 | 2 |
| 0 | 0 | 0 | 0 | 1 | 1 | 3 |
| 0 | 0 | 0 | 1 | 0 | 0 | 4 |
| 0 | 0 | 0 | 1 | 0 | 1 | 5 |
| 0 | 0 | 0 | 1 | 1 | 0 | 6 |
| 0 | 0 | 0 | 1 | 1 | 1 | 7 |
| 0 | 0 | 1 | 0 | 0 | 0 | 8 |
| 0 | 0 | 1 | 0 | 0 | 1 | 9 |
| 0 | 0 | 1 | 0 | 1 | 0 | 10 |
| 0 | 0 | 1 | 0 | 1 | 1 | 11 |

TABLE 1-continued

| | | | | | | |
|---|---|---|---|---|---|---|
| 0 | 0 | 1 | 1 | 0 | 0 | 12 |
| 0 | 0 | 1 | 1 | 0 | 1 | 13 |
| 0 | 0 | 1 | 1 | 1 | 0 | 14 |
| 0 | 0 | 1 | 1 | 1 | 1 | 15 |
| 0 | 1 | 0 | 0 | 0 | 0 | 16 |
| 0 | 1 | 0 | 0 | 0 | 1 | 17 |
| 0 | 1 | 0 | 0 | 1 | 0 | 18 |
| 0 | 1 | 0 | 0 | 1 | 1 | 19 |
| 0 | 1 | 0 | 1 | 0 | 0 | 20 |
| 0 | 1 | 0 | 1 | 0 | 1 | 21 |
| 0 | 1 | 0 | 1 | 1 | 0 | 22 |
| 0 | 1 | 0 | 1 | 1 | 1 | 23 |
| 0 | 1 | 1 | 0 | 0 | 0 | 24 |
| 0 | 1 | 1 | 0 | 0 | 1 | 25 |
| 0 | 1 | 1 | 0 | 1 | 0 | 26 |
| 0 | 1 | 1 | 0 | 1 | 1 | 27 |
| 0 | 1 | 1 | 1 | 0 | 0 | 28 |
| 0 | 1 | 1 | 1 | 0 | 1 | 29 |
| 0 | 1 | 1 | 1 | 1 | 0 | 30 |
| 0 | 1 | 1 | 1 | 1 | 1 | bULb |
| b1 | b2 | b3 | b4 | b5 | b6 | Shutter Time |
| 1 | 0 | 0 | 0 | 0 | 0 | 1000 |
| 1 | 0 | 0 | 0 | 0 | 1 | 500 |
| 1 | 0 | 0 | 0 | 1 | 0 | 250 |
| 1 | 0 | 0 | 0 | 1 | 1 | 125 |
| 1 | 0 | 0 | 1 | 0 | 0 | 60 |
| 1 | 0 | 0 | 1 | 0 | 1 | 30 |
| 1 | 0 | 0 | 1 | 1 | 0 | 15 |
| 1 | 0 | 0 | 1 | 1 | 1 | 8 |
| 1 | 0 | 1 | 0 | 0 | 0 | 4 |
| 1 | 0 | 1 | 0 | 0 | 1 | 2 |

Figure 2:
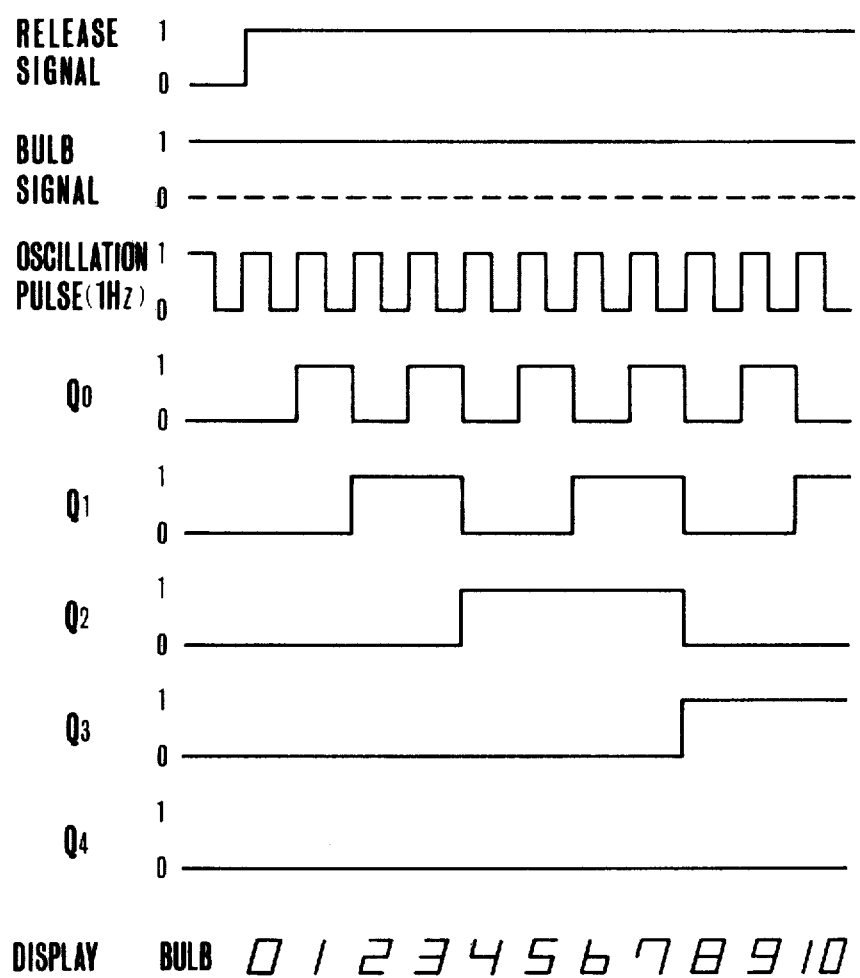
FIG. 2 shows the time charts of the respective parts of the circuit shown in FIG. 1.

Below, the operation of the above-mentioned arrangement will be explained in accordance with FIG. 2, whereby to begin with the display operation in case of ordinary photographing, other than the bulb photographing, will be explained.

In order to set the shutter time for example, at 1/250 sec., the shutter dial 4 is set at 250. Hereby, the switch S2, which is closed only at the position "B", remains open. Thus, the potential at the connecting point of the switch S2 to the resistor R2 is low and the level of the output of the AND gate 5 is low, so that even if the switch S1 is closed with the operation of the release button the low level is maintained. The low level output of the AND gate 5 is given to the AND gates $2_2$, $2_4$, $2_6$, $2_8$, $2_{10}$ and $2_{12}$ so that the level of the outputs of the AND gates $2_2$, $2_4$, $2_6$, $2_8$, $2_{10}$ and $2_{12}$ are kept low. Further, the output of the AND gate 5 is inverted by means of the inverter 6 and delivered to the reset terminal of the counter 7, so that the counter 7 is always reset and does not count the pulses coming from the pulse generating circuit 8. The output of the AND gate which is inverted by means of the above-mentioned inverter 6 is delivered to the AND gates $2_1$, $2_3$, $2_5$, $2_7$, $2_9$ and $2_{11}$, so that the outputs of the AND gates $2_1$, $2_3$, $2_5$, $2_7$, $2_9$ and $2_{11}$ are determined in accordance with the output of the register 1. To the register 1 the information of the shutter time 1/250 sec. which has been set by means of the shutter dial 4 is entered. The output terminals a1, a2, a3, a4, a5 and a6 of the register 1 deliver the signal "1.0.0.0.1.0." to the AND gates $2_1$, $2_3$, $2_5$, $2_7$, $2_9$ and $2_{11}$. Thus, the level of the outputs of the AND gates $2_1$ and $2_9$ becomes high, while that of the outputs of the AND gates $2_3$, $2_5$, $2_7$, $2_9$ and $2_{11}$ becomes low. Consequently, the level of the outputs of the OR gates 2a and 2e is high, while that of the outputs of the OR gates 2b, 2c, 2d and 2f is low. Thus, the signal at the input terminals b1, b2, b3, b4, b5 and b6 of the decoder driver 11 is "1.0.0.0.1.0.", whereby the display circuit 12 displays "250" as the shutter time of 1/250 sec.

Below the display operation for the bulb photographing will be explained.

When the shutter dial 4 is set at the bulb position "B", the switch S2 is closed and the potential at the connecting point of the switch S2 to the resistor R2 becomes high. However, the level of the output of the AND gate 5 remains low until the switch S1 is closed with the operation of the release button 3. Thus, the output of the gate circuit 2 is determined in accordance with the output of the register 1 as explained above. At this time, to the register 1 the bulb photographing information set by means of the shutter dial 4 is input so that from the entered terminals a1, a2, a3, a4, a5 and a6 of the register 1 the signal "0.1.1.1.1.1." is delivered to the AND gate $2_1$, $2_3$, $2_5$, $2_7$, $2_9$ and $2_{11}$. Thus, the level of the output of the AND gates $2_3$, $2_5$, $2_7$, $2_9$ and $2_{11}$, excepting $2_1$, becomes high, while that of the output of the OR gate 2a becomes low, whereby that of the outputs of the OR gates 2b, 2c, 2d, 2e and 2f becomes high. Thus, the signal at the input terminals b1, b2, b3, b4, b5 and b6 of the decoder driver 11 becomes "0.1.1.1.1.1.", which is displayed as b U L b by means of the display circuit.

When the switch S1 is closed with the operation of the release button 3, the potential at the connecting point of the switch S1 and the resistor R1 becomes high and the level of the output of the AND gate 5 becomes high. The high level output of the AND gate 5 is given to the AND gates $2_2$, $2_4$, $2_6$, $2_8$, $2_{10}$ and $2_{12}$, whose outputs are determined in accordance with the output of the counter 7. The output of the AND gate 5 is inverted by means of the inverter 6 and delivered to the AND gates $2_1$, $2_3$, $2_5$, $2_7$, $2_9$ and $2_{11}$ so as to keep the level of their outputs low. The high level output of the above-mentioned AND gate 5 is inverted into low level output by means of the inverter 6 and given to the reset terminal R of the counter 7 so as to release the reset counter 7, whereby the pulse of 1 Hz is applied from the pulse generator 8 to the input terminal C of the counter 7 through the AND gate 9. Thus, the counter 7 counts the pulses of 1 Hz and delivers a signal in accordance with the count value. At the beginning the signal at the output terminals of the counter 7 is "0.0.0.0.0.", so that the level of the AND gates $2_4$, $2_6$, $2_8$, $2_{10}$ and $2_{12}$ is low, while the level of the AND gate $2_2$ is low, the level of the OR gates 2a ... 2f is all low so that the signal at the input terminal of the decoder driver 11 is "0.0.0.0.0.0.", whereby the display circuit 12 displays "0". At the first rising up of the oscillation pulse, namely after the lapse of one second, the output at the output terminal Q0 of the counter 7 becomes "1" and the level of the AND gate $2_{12}$ becomes high and the level of the OR gate 2f becomes high, while the signal at the input terminals b1, b2, b3, b4, b5 and b6 of the decoder driver 11 becomes "0.0.0.0.0.1." so that the display circuit displays "1". At the next rising up of the oscillation pulse, namely after the lapse of 2 seconds only the signal at the output terminal Q1 of the counter 7 becomes "1" and the level of the AND gate $2_{10}$ becomes high, while the level of the OR gate 2e becomes high so that the signal at the input terminals b1, b2, b3, b4, b5 and b6 of the decoder driver 11 becomes "0.0.0.0.1.0.", whereby the display circuit displays "2". Afterwards, in the same way as mentioned above, at every rising up of the oscillation pulse the counter 7 counts up, whereby the display circuit 12 displays the lapse time of the bulb photographing in accordance with the count value. The lapse time display of the bulb photographing continues as long as the release button 3 is being operated, while when the operation of the release button 3 is discontinued the potential at the connecting point of the switch S1 to the resistor R1 becomes low, whereby the level of the output of the AND gate 5 becomes low. When the level of the output of the AND gate 5 becomes low, as mentioned above, the output of the gate circuit 2 is determined in accordance with the output of the register 1, whereby the display circuit 12 displays b U L b as mentioned above.

Hereby unless the operation of the release button 3 is continued so as to display the lapse time of the bulb photographing, at the next rising up of the oscillation pulse after the lapse of 30 seconds, the output terminals Q0, Q1, Q2, Q3 and Q4 of the counter deliver the signal "1.1.1.1.1." so that the level of the outputs of the AND gates $2_4$, $2_6$, $2_8$, $2_{10}$ and $2_{12}$ becomes high, and the level of the outputs of the OR gates $2b$, $2c$, $2d$, $2e$ and $2f$ becomes high. Consequently, the signal at the input terminals of the decoder driver 11 is "0.1.1.1.1.1.", whereby the display circuit 12 displays b U L b and at the next rising up of the oscillation pulse the count value of the counter 7 resumes the initial state, while at the same time a high level signal is produced from the carry out terminal CO of the counter 7. The high level signal from the carry out terminal CO is inverted by means of the inverter 10 and delivered to the AND gate 9 so that after then afterwards the level of the output of the AND gate 9 is kept low. Because the count value of the counter 7 resumes the initial state, the signal at the input terminals b1, b2, b3, b4, b5 and b6 of the binary counter 11 becomes "0.0.0.0.0.0." as mentioned above so that the display circuit displays "0".

Below the second embodiment of the present invention will be explained in accordance with FIGS. 3 and 4.

Figure 3:
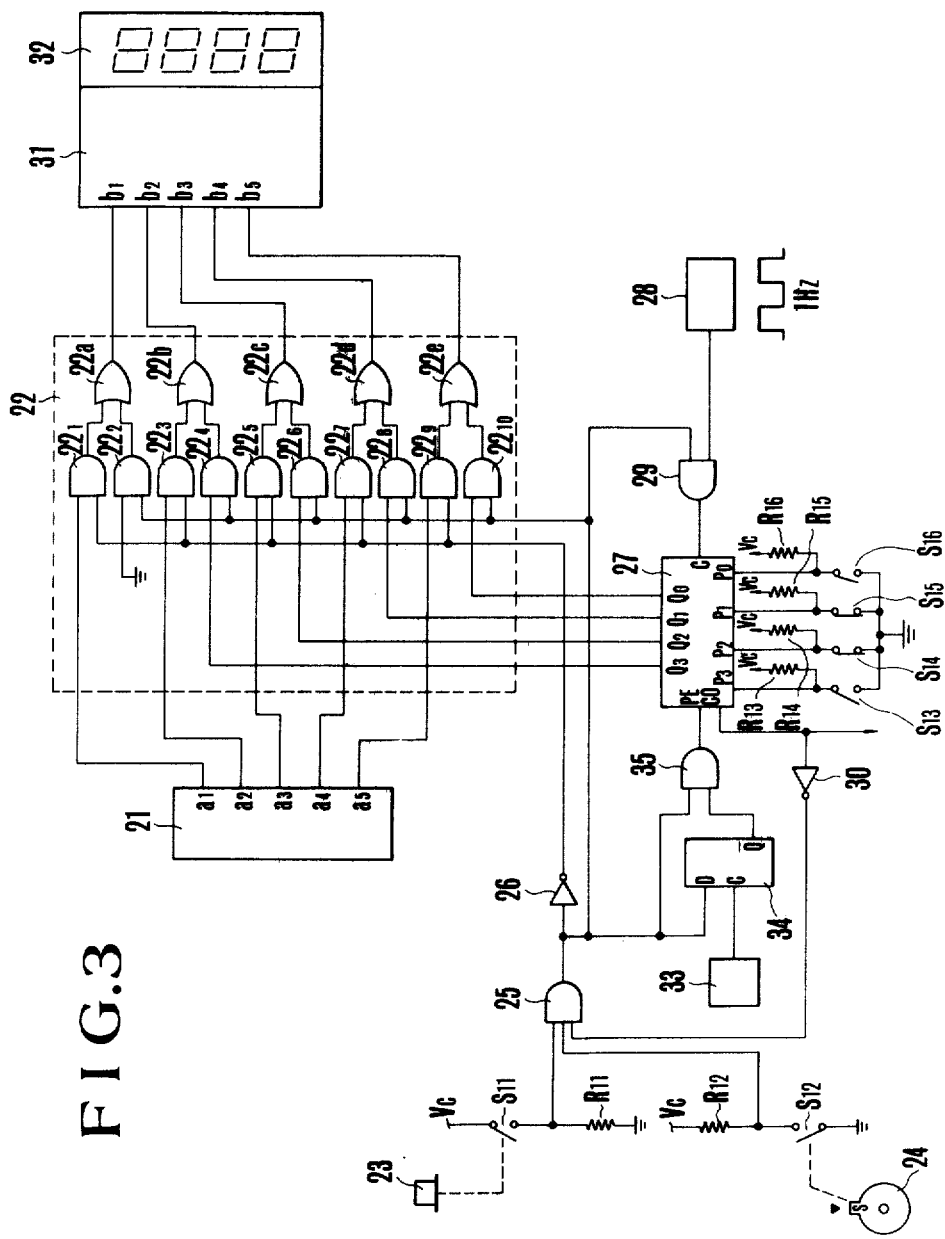
FIG. 3 shows the second embodiment of the control circuit of the display device for camera.
Figure 4:
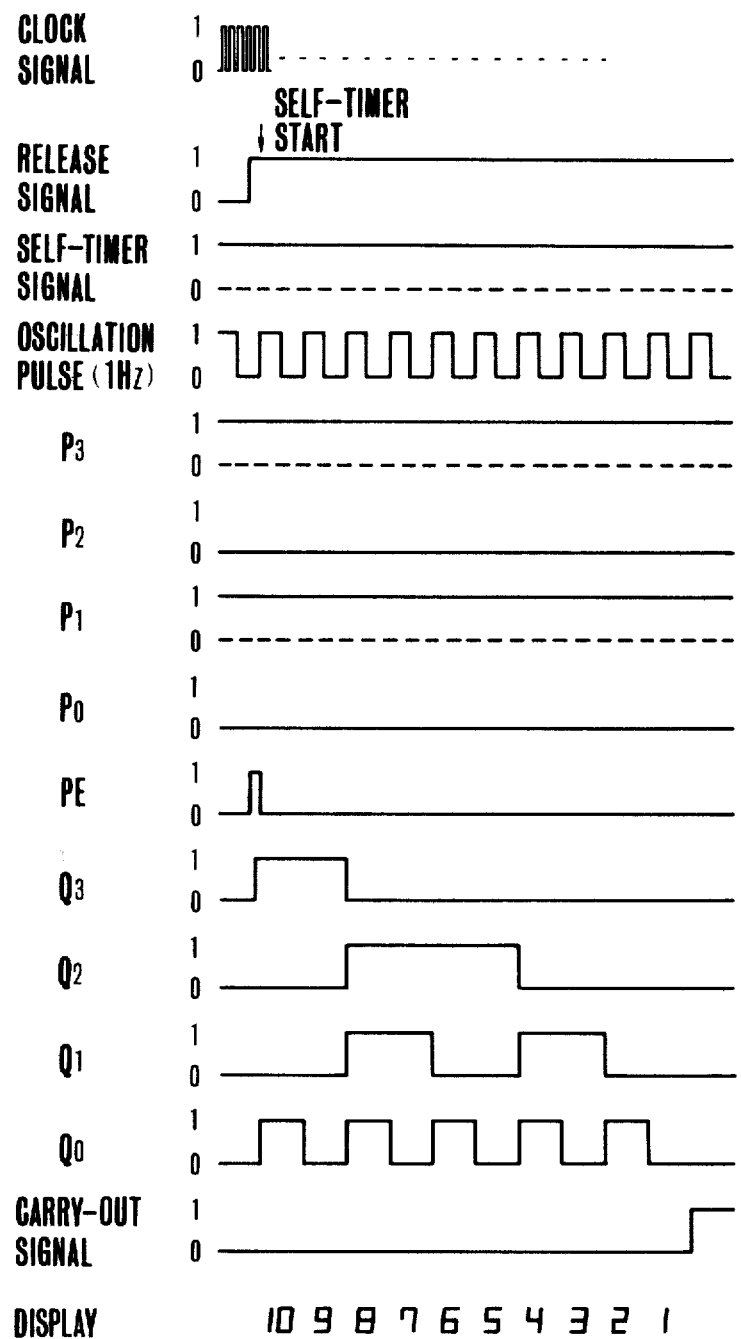
FIG. 4 shows the time charts of the respective parts of the circuit shown in FIG. 2.

FIG. 3 shows the control circuit for displaying the remaining time of the bulb photographing. The drawing shows a register 21 to which the shutter time information or the calculated shutter time information is given, and which produces the shutter time information of the camera to be given to the gate circuit 22.

The gate circuit 22 consists of the AND gates $22_1$, $22_2$, ... $22_{10}$ and the OR gates $22a$, $22b$ ... $22e$. A switch S11 is closed with the operation of the release button 23, whereby to one terminal of the switch S11 the voltage Vc is applied, while the other terminal is grounded through the resistor R11. A switch S12 is opened when the self-timer setting dial 24 is set at the self-timing position "S". To one terminal the voltage Vc is applied through the resistor R12, and the other terminal is grounded. An AND gate 25 has one input terminal connected to the connecting point of the switch S11 to the resistor R11, and another input terminal is connected to the connecting point of the switch S12 to the resistor R12. The output of the AND gate 25 is applied to one input terminal of the AND gates $22_2$, $22_4$, $22_6$, $22_8$ and $22_{10}$ of the above-mentioned gate circuit 22. The output of the AND gate is further given to one input terminal of the AND gates $22_1$, $22_3$, $22_5$, $22_7$ and $22_9$ through an inverter 26. A preset double binary down counter 27 has an input terminal C to which pulses of 1 Hz are delivered from a pulse generator 28 through an AND gate 29. The carry out terminal CO of the counter 27 is connected to the input terminal of the AND gate 25 through an inverter 30. The high level signal from the carry out terminal CO is taken out as the release operation starting signal. A clock pulse generating circuit 33 provides a clock oscillation pulse to the input terminal $\overline{C}$ of a flip flop 34. The output from the output terminal $\overline{Q}$ of the flip flop 34 is given to the input terminal PE of the counter 27 through an AND gate 35. The output of the AND gate 25 is given to the AND gates 29 and 35, and further to the input terminal D of the flip flop 34. The input terminals P0, P1, P2 and P3 of the counter 27 are grounded respectively through corresponding switches S13, S14, S15 and S16, and are provided with the voltage Vc through corresponding resistors R13, R14, R15 and R16 when the switches S13, S14, S15 and S16 are opened. The output terminals Q0, Q1, Q2 and Q3 of the counter 27 are respectively connected to the other input terminal of the AND gates $22_{10}$, $22_8$, $22_6$ and $22_4$ of the gate circuit 22. The other input terminal of the AND gate $22_2$ is grounded. The output terminals a1, a2, a3, a4 and a5 of the above-mentioned register 21 are respectively connected to the other input terminal of the AND gates $22_1$, $22_3$, $22_5$, $22_7$ and $22_9$ of the gate circuit 22. The outputs of the AND gates $22_1$ and $22_2$, that of $22_3$ and $22_4$, that of $22_5$ and $22_6$, that of $22_7$ and $22_8$, and that of $22_9$ and $22_{10}$ of the gate circuit 22 are respectively given to the corresponding OR gates $22a$, $22b$, $22c$, $22d$ and $22e$. The outputs of the OR gates $22a$, $22b$, $22c$, $22d$ and $22e$ are given to the display circuit 32 through the decoder driver 31 as the output of the gate circuit 22. The display circuit 32 consists of 4 sets of 7 segment elements connected parallel to each other so as to display the shutter time or self-timer time in the view finder or on the camera body. To the input terminals b1, b2, b3, b4 and b5 of the decoder driver 31, the outputs of the corresponding OR gates $22a$, $22b$, $22c$, $22d$ and $22e$ are respectively given in such a manner that the display circuit 32 carries out the display as is given in the table 2, in accordance with the signal given to the input terminals b1, b2, b3, b4 and b5.

TABLE 2

| b1 | b2 | b3 | b4 | b5 | Self-timer Time |
|----|----|----|----|----|-----------------|
| 0 | 0 | 0 | 0 | 0 | 1 |
| 0 | 0 | 0 | 0 | 1 | 2 |
| 0 | 0 | 0 | 1 | 0 | 3 |
| 0 | 0 | 0 | 1 | 1 | 4 |
| 0 | 0 | 1 | 0 | 0 | 5 |
| 0 | 0 | 1 | 0 | 1 | 6 |
| 0 | 0 | 1 | 1 | 0 | 7 |
| 0 | 0 | 1 | 1 | 1 | 8 |
| 0 | 1 | 0 | 0 | 0 | 9 |
| 0 | 1 | 0 | 0 | 1 | 10 |
| 0 | 1 | 0 | 1 | 0 | 11 |
| 0 | 1 | 0 | 1 | 1 | 12 |
| 0 | 1 | 1 | 0 | 0 | 13 |
| 0 | 1 | 1 | 0 | 1 | 14 |
| 0 | 1 | 1 | 1 | 0 | 15 |
| 0 | 1 | 1 | 1 | 1 | 16 |

| b1 | b2 | b3 | b4 | b5 | Shutter Time |
|----|----|----|----|----|--------------|
| 1 | 0 | 0 | 0 | 0 | 1000 |
| 1 | 0 | 0 | 0 | 1 | 500 |
| 1 | 0 | 0 | 1 | 0 | 250 |
| 1 | 0 | 0 | 1 | 1 | 125 |
| 1 | 0 | 1 | 0 | 0 | 60 |
| 1 | 0 | 1 | 0 | 1 | 30 |
| 1 | 0 | 1 | 1 | 0 | 15 |
| 1 | 0 | 1 | 1 | 1 | 8 |
| 1 | 1 | 0 | 0 | 0 | 4 |
| 1 | 1 | 0 | 0 | 1 | 2 |

Below, the operation of the above arrangement will be explained in accordance with FIG. 4, whereby to begin with, the display operation without using the self-timer will be explained.

Now, let us suppose that the shutter dial, not shown in the drawing, is set for example, at the shutter time of 1/250 sec. or as the result of a calculation the shutter time of 1/250 sec. is obtained. The self-timer setting dial is now out of the self-timer position "S". The switch S12, which is not opened when the self-timer setting dial is out of the position "S", remains closed. Consequently the potential at the connecting point of the switch S12 to the resistor R12 is low and the level of the output of the AND gate 25 is low, whereby even if the switch S11 is closed with the operation of the release button 23, a low level is maintained. The low level output of the AND gate 25 is given to the AND gates $22_2$, $22_4$, $22_6$, $22_8$ and $22_{10}$ so that the level of the outputs of the AND gates $22_2$, $22_4$, $22_6$, $22_8$ and $22_{10}$ is maintained low. Further, the low level output of the AND gate 25 is given to the AND gates 29 and 35, the level of whose outputs is kept low so that no pulse is given to the terminals C and PE of the counter 27. Further, the low level output of the AND gate 25 is inverted into the high level signal, which is given to the AND gates $22_1$, $22_3$, $22_5$, $22_7$ and $22_9$, whose outputs are determined in accordance with the output of the register 21, to which the information the shutter time of 1/250 sec., which is set by means of the shutter dial or obtained from the calculation, is entered. From the output terminals a1, a2, a3, a4 and a5 of the register 21, the signal "1.0.0.1.0" is delivered to the AND gates $22_1$, $22_3$, $22_5$, $22_7$ and $22_9$. Consequently, the level of the outputs of the AND gates $22_1$ and $22_7$ becomes high, while that of the outputs of the AND gates $22_3$, $22_5$ and $22_9$ becomes low. Thus, the level of the outputs of the OR gates 22a and 22d is high, while that of the outputs of the OR gates 22b, 22c and 22e is low. Consequently, the signal at the input terminals b1, b2, b3, b4 and b5 of the decoder driver 31 is "1.0.0.1.0", so that the display circuit 32 displays "250" as the shutter time of 1/250 sec.

Below, the display operation in case of the self-timer photographing will be explained.

When the self-timer setting dial 24 is set at the self-timing position "S", the switch S12 is opened, whereby the potential at the connecting point of the switch S12 to the resistor R12 becomes high. However, until the switch S11 is closed with the operation of the release button 3 the level of the output of the AND gate 25 is low. Consequently, the output of the gate circuit 22 is, as mentioned above, determined in accordance with the output of the register 21. Thus, when the signal at the output terminals a1, a2, a3, a4 and a5 of the register 21 is "1.0.0.1.0", the display circuit 32 displays "250" as the shutter time of 1/250 sec.

When the switch S11 is closed with the operation of the release button the potential at the connecting point of the switch S11 to the resistor R11 becomes high, whereby the level of the output of the AND gate 25 becomes high. The high level output of the AND gate 25 is given to the AND gates $22_2$, $22_4$, $22_6$, $22_8$ and $22_{10}$, whose outputs are determined in accordance with the output of the counter 27. The output of the AND gate 25 is inverted by means of the inverter 26 and given to the AND gates $22_1$, $22_3$, $22_5$, $22_7$ and $22_9$ so as to keep the level of their outputs low. The high level output of the above-mentioned AND gate 25 is given to the AND gates 29 and 35 and, at the same time, to the input terminal D of the flip flop 34. At this moment the flip flop 34 is not inverted, delivering a high level signal from the output terminal $\overline{Q}$, and inverted only at the next rising up of the oscillation clock pulse from the clock pulse generating circuit 33, whereby the level of the output at the output terminal $\overline{Q}$ becomes low. Consequently, the level of the output of the AND gate 35 becomes high for an instant with the operation of the release button 23. Namely, a preset enable pulse is given from the AND gate 35 to the terminal PE of the counter 27. Thus, to the counter 27 the information in accordance with the opening and the closing of the switches S13, S14, S15 and S16 is preset. As is shown in the drawing, the switches S13 and S16 out of S13, S14, S15 and S16 are opened, while the switches S14 and S15 are closed. Consequently, the signal "1.0.0.1" is preset at the input terminals P0, P1, P2 and P3 of the counter 27. At the same time, the counter 27 starts to count down the oscillation pulses of 1 Hz from the pulse generating circuit 28 so as to deliver a signal corresponding to the count value. At the beginning, the outputs of the output terminals Q0, Q1, Q2 and Q3 of the counter 27 are "1.0.0.1", so that the level of the AND gates $22_6$ and $22_8$ is low, while that of the AND gates $22_4$ and $22_{10}$ is high. Further, because the level of the AND gate $22_2$ is low, that of the OR gates 22b and 22e is high, while that of the OR gates 22a, 22c and 22d is low. Consequently, the signal at the input terminals b1, b2, b3, b4 and b5 of the decoder driver 31 are "0.1.0.0.1", whereby the display circuit 32 displays "10". Then, at the first rising up of the oscillation pulse, namely after the lapse of 1 second, the output at the output terminal Q0 of the counter 27 is inverted out of "1" into "0", and the level of the AND gate $2_{10}$ becomes low, whereby the level of the OR gate 22e becomes low so that the signal at the input terminals b1, b2, b3, b4 and b5 of the decoder driver 31 becomes "0.1.0.0.0" and the display circuit 32 displays "9". At the next rising up of the oscillation pulse, namely after the lapse of 2 seconds, the outputs of the output terminals Q0, Q1 and Q2 of the counter 27 become "1", while that of the output terminal Q3 becomes "0". Thus, the level of the AND gate $22_4$ becomes low, that of $22_6$, $22_8$ and $22_{10}$ high, that of the OR gate 22a, 22b low and that of 22c, 22d and 22e low. Consequently, the signal at the input terminals b1, b2, b3, b4 and b5 of the decoder driver is "0.0.1.1.1", whereby the display circuit 32 displays "8". Afterwards, in the same way as mentioned above, at each rising up of the oscillation pulse, the value is counted down in such a manner that in accordance with the count value, the display circuit 32 displays the remaining time of the self-timer. When all the outputs at the output terminals Q0, Q1, Q2, Q3 and Q4 of the counter 27 become "0", the level of the outputs of the AND gates $22_4$ $22_6$, $22_8$ and $22_{10}$ becomes low and that of the OR gates 22a, 22b, 22c, 22d and 22e becomes low. Thus, the signal at the input terminals b1, b2, b3, b4 and b5 of the decoder driver 31 becomes "0.0.0.0.0", whereby the display circuit 32 displays "1", which means that the remaining time of the self-timer is 1 second. At the same time, when at the next rising up of the oscillation pulse the count value of the counter 27 resumes the initial state, a high level signal is delivered from the carry out terminal CO of the counter 27. The high level signal from the carry out terminal CO is taken out as the release operation starting signal, and at the same time inverted by means of the inverter 30 so as to be applied to the AND gate 25, the level of whose output is maintained low. Consequently, after the operation of the self-timer the output of the gate circuit 22 is determined in accordance with the output of the register 21 as mentioned above. Thus, when the signal at the output terminals a1, a2, a3, a4 and a5 of the register 21 is "1.0.0.1.0", the display circuit 32 displays "250", which means that the shutter time is 1/250 sec.

Below, the operation of the third embodiment will be explained in accordance with FIGS. 5 and 6.

FIG. 5 shows the control circuit for displaying the remaining time of the long exposure time shutter. In the drawing, a register 41 is provided with the information of the set shutter time or the calculated shutter time, and delivers the shutter time information to the gate circuit 42. The gate circuit 42 consists of the AND gates $42_1$, $42_2 \ldots 42_{12}$ and the OR gates 42a, 42b ... 42f. A switch S21 is closed with the operation of the release button 43, whereby to one terminal of the switch S21 the voltage Vc is applied, while the other terminal is grounded through the registor R21. An AND gate 45 has one input terminal connected to the connecting point to the switch S21 to the registor R21, and the other input terminal is connected the output terminal a1 of the register 41 through the inverter 46. The output of the AND gate 45 is applied to the AND gates $42_1$, $42_3$, $42_5$, $42_7$, $42_9$ and $42_{11}$ of the gate circuit 42. A 5 bit presettable binary down counter 47 has an input terminal C to which pulses of 1 Hz are applied from the pulse generating circuit 48 through the AND gate 49. A clock pulse generating circuit 53 applies clock oscillation pulses to the input terminal C of the flip flop 54. The output of the output terminal Q of the flip flop 54 is applied to the input terminal PE of the counter 47 through the AND gate 55. The output of the AND gate 45 is applied to the AND gates 49 and 55, and also to the input terminal D of the flip flop 54. The input terminals P0, P1, P2, P3, and P4 of the counter 47 are respectively connected to the corresponding output terminals a6, a5, a4, a3, and a2 of the register 41. The output terminals Q0, Q1, Q2, Q3 and Q4 of the counter 47 are respectively connected to the other input terminals of the corresponding AND gates $42_{11}$, $42_9$, $42_7$, $42_5$ and $42_3$ of the gate circuit 42. The other input terminal of the AND gate $42_1$ is grounded. The output terminal a1 of the register 41 is connected to the other input terminals of the AND gates $42_2$, $42_4$, $42_6$, $42_8$ and $42_{10}$, while the output terminals a2, a3, a4, a5 and a6 of the register 41 are respectively connected to the other input terminals of the corresponding AND gates $42_2$, $42_4$, $42_6$, $42_8$ and $42_{10}$ of the gate circuit 42. The output of the output terminal a1 of the register 41, and that of the AND gate $42_1$, are applied to the OR gate 42a, while the outputs of the AND gates $42_2$ and $42_3$, those of $42_4$ and $42_5$, those of $42_6$ and $42_7$, those of $42_8$ and $42_9$ and those of $42_{10}$ and $42_{11}$ are respectively applied to the corresponding OR gates 42b, 42c, 42d, 42e and 42f, whose outputs are delivered to the display circuit 52 through the decoder driver 51 as the output of the gate circuit 42. The display circuit 52 consists of 4 sets of 7 segment elements connected parallel to each other so as to display the shutter time, or the remaining time of the long exposure time shutter, in the view finder or on the camera body. To the input terminals b1, b2, b3, b4, b5 and b6 of the decoder driver 51, the outputs of the corresponding OR gates 42a, 42b, 42c, 42d, 42e and 42f are connected so as to carry out the display by means of the display circuit 52, in accordance to the signal applied to the input terminals b1, b2, b3, b4, b5 and b6 as is shown in table 3.

TABLE 3

| b1 | b2 | b3 | b4 | b5 | b6 | Long Time Shutter |
|---|---|---|---|---|---|---|
| 0 | 0 | 0 | 0 | 0 | 0 | 1 |
| 0 | 0 | 0 | 0 | 0 | 1 | 2 |
| 0 | 0 | 0 | 0 | 1 | 0 | 3 |
| 0 | 0 | 0 | 0 | 1 | 1 | 4 |
| 0 | 0 | 0 | 1 | 0 | 0 | 5 |
| 0 | 0 | 0 | 1 | 0 | 1 | 6 |
| 0 | 0 | 0 | 1 | 1 | 0 | 7 |
| 0 | 0 | 0 | 1 | 1 | 1 | 8 |
| 0 | 0 | 1 | 0 | 0 | 0 | 9 |
| 0 | 0 | 1 | 0 | 0 | 1 | 10 |
| 0 | 0 | 1 | 0 | 1 | 0 | 11 |
| 0 | 0 | 1 | 0 | 1 | 1 | 12 |
| 0 | 0 | 1 | 1 | 0 | 0 | 13 |
| 0 | 0 | 1 | 1 | 0 | 1 | 14 |
| 0 | 0 | 1 | 1 | 1 | 0 | 15 |
| 0 | 0 | 1 | 1 | 1 | 1 | 16 |
| 0 | 1 | 0 | 0 | 0 | 0 | 17 |
| 0 | 1 | 0 | 0 | 0 | 1 | 18 |
| 0 | 1 | 0 | 0 | 1 | 0 | 19 |
| 0 | 1 | 0 | 0 | 1 | 1 | 20 |
| 0 | 1 | 0 | 1 | 0 | 0 | 21 |
| 0 | 1 | 0 | 1 | 0 | 1 | 22 |
| 0 | 1 | 0 | 1 | 1 | 0 | 23 |
| 0 | 1 | 0 | 1 | 1 | 1 | 24 |
| 0 | 1 | 1 | 0 | 0 | 0 | 25 |
| 0 | 1 | 1 | 0 | 0 | 1 | 26 |
| 0 | 1 | 1 | 0 | 1 | 0 | 27 |
| 0 | 1 | 1 | 0 | 1 | 1 | 28 |
| 0 | 1 | 1 | 1 | 0 | 0 | 29 |
| 0 | 1 | 1 | 1 | 0 | 1 | 30 |
| 0 | 1 | 1 | 1 | 1 | 0 | 31 |
| 0 | 1 | 1 | 1 | 1 | 1 | 32 |

| b1 | b2 | b3 | b4 | b5 | b6 | Shutter Time |
|---|---|---|---|---|---|---|
| 1 | 0 | 0 | 0 | 0 | 0 | 1000 |
| 1 | 0 | 0 | 0 | 0 | 1 | 500 |
| 1 | 0 | 0 | 0 | 1 | 0 | 250 |
| 1 | 0 | 0 | 0 | 1 | 1 | 125 |
| 1 | 0 | 0 | 1 | 0 | 0 | 60 |
| 1 | 0 | 0 | 1 | 0 | 1 | 30 |
| 1 | 0 | 0 | 1 | 1 | 0 | 15 |
| 1 | 0 | 0 | 1 | 1 | 1 | 8 |
| 1 | 0 | 1 | 0 | 0 | 0 | 4 |
| 1 | 0 | 1 | 0 | 0 | 1 | 2 |
| 0 | 0 | 0 | 0 | 0 | 0 | 1 |
| 0 | 0 | 0 | 0 | 0 | 1 | 2 |
| 0 | 0 | 0 | 0 | 1 | 1 | 4 |
| 0 | 0 | 0 | 1 | 1 | 1 | 8 |
| 0 | 0 | 1 | 1 | 1 | 1 | 16 |
| 0 | 1 | 1 | 1 | 1 | 1 | 32 |

Below, the operation of the above arrangement will be explained in accordance with FIG. 6, beginning with the display operation for photographing with a shutter time shorter than ½ sec.

Now let us suppose that the shutter time of, for example, 1/250 sec. is set by means of the shutter dial, not shown in the drawing, or has been obtained from a calculation. Consequently, the information of the shutter time 1/250 sec. has been entered in the register 41. Thus, the signal "1.0.0.0.1.0" is delivered from the output terminals a1, a2, a3, a4, a5 and a6 of the register 41. Thus, the high level output at the output terminal a1 of the register 41 is inverted into low level signal to be applied to the AND gate 45, the level of whose output is low and maintained low even if the switch S21 is closed with the operation of the release button 43. The low level output of the AND gate 45 is applied to the AND gates $42_1$, $42_3$, $42_5$, $42_7$, $42_9$ and $42_{11}$, the level of whose output is maintained low. Further, the low level output of the AND gate 45 is applied to the AND gates 49 and 55, the level of whose output is maintained low. Consequently, the counter 47 is neither preset nor counted down. The high level output at the output terminal a1 of the register 41 is applied to the AND gates $42_2$, $42_4$, $42_6$, $42_8$ and $42_{10}$, whose outputs are determined in accordance with the output of the register 41. The outputs from the output terminals a2, a3, a4, a5 and a6 of the register 41 are respectively applied to the AND gates $42_2$, $42_4$, $42_6$, $42_8$ and $42_{10}$, whereby only the level of the output of the AND gate $42_8$ is high. Thus, the level of the outputs of the OR gates 42a and 42e is high, while that of the outputs of the OR gates 42b, 42c, 42d and 42f is low. Consequently, the signals at the input terminals b1, b2, b3, b4, b5 and b6 of the decoder driver 51 is "1.0.0.0.1.0", whereby the display circuit 52 displays "250", which means that the shutter time is 1/250 sec.

Below, the display operation for photographing with the shutter time longer than 1 second will be explained.

Now let us suppose that the shutter time of for example, 8 sec. has been set by means of the shutter dial not shown in the drawing, or obtained from calculation. Consequently, the information of the shutter time of 8 sec. is entered into the register 41. Thus, from the output terminals a1, a2, a3, a4, a5 and a6 of the register 41 the signal "0.0.0.1.1.1" is delivered. Thus, the low level output from the output terminal a1 of the register 41 is inverted into high level output and applied to the AND gate 45, the level of whose output remains low until the release button is operated. The level of the output of the gate 45 becomes high when the switch S21 is closed with the operation of the switch S21. Thus, as long as the level of the output of the AND gate 45 is low, the counter 47 is neither preset nor counted down as mentioned above. Further, because the level of the output from the output terminal a1 of the register 41 is also low, the level of all of the AND gate $42_1$, $42_2$ ... $42_{11}$ is low, while the level of the OR gates 42a, 42b ... 42f is also low so that the signal at the input terminals b1, b2, b3, b4, b5 and b6 of the decoder driver is "0.0.0.0.0.0", whereby the display circuit 52 displays "1".

When the switch S21 is closed with the operation of the release button 43, the potential at the connecting point of the switch S21 to the resistor R21 becomes high and the level of the output of the AND gate 45 becomes high. The high level output of the AND gate 45 is applied to the AND gates $42_1$, $42_3$, $42_5$, $42_7$, $42_9$ and $42_{11}$, whereby the outputs of the AND gates $42_3$, $42_5$, $42_7$, $42_9$, and $42_{11}$ are determined in accordance with the output of the counter 47. At the same time the high level output of the above-mentioned AND gate 45 is applied to the AND gates 49 and 55 and further to the input terminal D of the flip flop 54. The flip flop 54 is not inverted at this moment, whereby a high level signal is delivered from the output $\overline{Q}$, but inverted at the next rising up of the oscillation clock pulse from the clock pulse generating circuit 53, whereby the level of the output at the output terminal Q becomes low. Thus, the level of the output of the AND gate 55 becomes instantly high with the operation of the release button 43. Namely, from the AND gate 55, a preset enable pulse is delivered to the counter 47. Thus, to the counter 47 the signal "0.0.1.1.1" at the output terminals a2, a3, a4, a5 and a6 is preset. At the same time the counter 47 starts to count down the oscillation pulses of 1 Hz from the pulse generating circuit 48 so as to deliver the signal corresponding to the count value. Because at the beginning the output of the output terminals Qo, Q1, Q2, A3 and Q4 of the counter 47 is "1.1.1.0.0.", the level of the AND gates $42_3$ and $42_5$ is low, while that of the AND gates $42_7$, $42_9$ and $42_{11}$ is high. Further, because the level of the AND gate $42_1$ is low, the level of the OR gates 42a, 42b and 42c is low, while that of the OR gates 42d, 42e and 42f is high. Thus, the signal at the input terminals b1, b2, b3, b4, b5 and b6 of the decoder driver 51 becomes "0.0.0.1.1.1", whereby the display circuit 52 displays "8". Then, at the first rising up of the oscillation pulse, namely after the lapse of 1 second, the output at the output terminal Qo of the counter 47 is inverted out of "1" into "0", whereby the level of the AND gate $42_{11}$ becomes low and that of the OR gate 42f becomes low so that the signal at the input terminals b1, b2, b3, b4, b5 and b6 of the decoder driver 51 becomes "0.0.0.1.1.0", whereby the display circuit 52 displays "7". At the next rising up of the oscillation pulse, namely after the lapse of 2 seconds, the output at the output terminal Qo of the counter 47 becomes "1" again, whereby the output at the output terminal Q1 is inverted out of "1" into "0". Thus, the level of the AND gate $42_{11}$ becomes high, while that of the OR gate 42f becomes low. Consequently, the level of the AND gate $42_9$ becomes high, while that of the OR gate 42e becomes low. Thus, the signal at the input terminals b1, b2, b3, b4, b5 and b6 of the decoder driver 51 becomes "0.0.0.1.0.1", whereby the display circuit 52 displays "6". Afterwards, in the same way as mentioned above at every rising up of the oscillation pulse the pulses are counted down, whereby the display circuit 52 displays the remaining time of the long time photographing in accordance with the count value. When all of the output levels at the output terminals Qo, Q1, Q2, Q3 and Q4 of the counter 47 becomes "0", the level of the AND gates $42_3$, $42_5$, $42_7$, $42_9$ and $42_{11}$ becomes low and that of the OR gates 42a–42f becomes low. Thus, the signal at the input terminals b1, b2, b3, b4, b5, and b6 of the decoder driver 51 becomes "0.0.0.0.0.0", whereby the display circuit 52 display "1", which means that the remaining time of the long time photographing is 1 sec. As soon as at the next rising up of the oscillation pulse the count value of the counter 57 resumes the initial state, a high level signal is delivered from the carry out terminal CO of the counter 47. The high level signal from the carry out terminal CO is taken out as the release operation starting signal, and is at the same time inverted by means of the inverter 55A and applied to the AND gate 45, so that afterwards the level of the output of the AND gate 45 remains low. Thus, the signal at the input terminals b1, b2, b3, b4, b5, and b6 of the decoder driver after the operation of the long time photographing becomes "0.0.0.0.0.0" as mentioned above, whereby the display circuit 52 displays "1".

As explained above in detail in accordance with the present invention the time or the remaining time of the bulb photographing, the self-timer photographing or the long time photographing operation can be displayed in a concrete way, so that the time or the remaining time of the operation can be recognized correctly, which contributes much to the realization of a very effective display device for a camera.

What is claimed is:

1. A display device for a photographic camera, comprising:
   (a) means for producing a release signal in response to a release operation of the camera;
   (b) means for producing a bulb phtographing setting signal in response to setting of a bulb photographing mode of camera operation;
   (c) a counter for counting a number of input pulses and providing a counter output;

(d) a decoder for decoding the output of the counter;
(e) display means for displaying the output of the counter; and
(f) control means for enabling the display means to display the output of the counter the content of which varies successively, when both of the release signal and the bulb photographing setting signal are applied to input terminals of the control means.

2. A display device according to claim 1, wherein the control means comprises of a gate circuit including a first input terminal connected to the release signal producing means and a second input terminal connected to the bulb photographing setting signal producing means.

3. A display device according to claim 2, wherein the gate circuit includes an AND gate coupled to a reset terminal of the counter for initiating the counting operation of the counter upon receipt of both of the release signal and the bulb photographing setting signal.

4. A display device for a photographic camera, comprising:
(a) means for producing a release signal in response to a release operation of the camera;
(b) means for producing a bulb photographing setting signal in response to setting of a bulb photographing mode of camera operation;
(c) a counter for counting a number of input pulses and providing a counter output;
(d) a decoder for decoding the output of the counter;
(e) display means for displaying the output of the counter; and
(f) control means for enabling the display means to display the output of the counter the content of which varies successively, after both of the release signal and the bulb photographing setting signal have been produced.

* * * * *